(12) United States Patent
Paul (10) Patent No.: US 8,992,646 B2
(45) Date of Patent: Mar. 31, 2015

(54) DUST-COLLECTING SYSTEMS AND APPARATUSES

(75) Inventor: Patrick M. Paul, Canton, GA (US)

(73) Assignee: Dustex Corporation, Kennesaw, GA (US)

( * ) Notice: Subject to any disclaimer, the term of this patent is extended or adjusted under 35 U.S.C. 154(b) by 322 days.

(21) Appl. No.: 13/408,581

(22) Filed: Feb. 29, 2012

(65) Prior Publication Data

US 2013/0219841 A1 Aug. 29, 2013

(51) Int. Cl.
*B01D 39/00* (2006.01)
*B01D 46/00* (2006.01)
*B01D 46/24* (2006.01)

(52) U.S. Cl.
CPC ........ *B01D 46/0013* (2013.01); *B01D 46/0039* (2013.01); *B01D 2273/20* (2013.01); *B01D 46/2407* (2013.01)
USPC ............... 55/302; 55/303; 55/323; 55/436; 55/444; 55/446; 95/216

(58) Field of Classification Search
CPC ................................ B01D 46/13; B01D 46/39
USPC ........... 55/302–303, 323, 436, 444, 446, 482; 95/216
See application file for complete search history.

(56) References Cited

U.S. PATENT DOCUMENTS

| | | | |
|---|---|---|---|
| 3,726,066 A | 4/1973 | Colley et al. | |
| 4,158,554 A | 6/1979 | Bundy et al. | |
| 4,955,990 A * | 9/1990 | Napadow | 95/216 |
| 4,955,996 A | 9/1990 | Edwards et al. | |
| 5,062,867 A | 11/1991 | Klimczak | |
| 5,395,409 A | 3/1995 | Klimczak et al. | |
| 5,421,846 A | 6/1995 | Klimczak | |
| 5,730,886 A * | 3/1998 | Wachinski et al. | 210/792 |
| 6,643,130 B1 * | 11/2003 | DeMarchis et al. | 361/695 |
| 7,479,170 B1 * | 1/2009 | Collette | 55/302 |
| 2002/0007734 A1 | 1/2002 | Felix | |
| 2009/0120292 A1 | 5/2009 | Foster | |

OTHER PUBLICATIONS

International Search Report and Written Opinion for Application No. PCT/US2013/028182.
Jet III® Pulse Jet Dust Collectors; Wheelabrator Air Pollution Control Inc., A Siemens Company; Copyright 2005.
Destex, Inc. Filter Bags for Industry; downloaded at http://www.destexinc.com/filterbags.htm on Feb. 10, 2012; pp. 1-4.

* cited by examiner

*Primary Examiner* — Robert Clemente
*Assistant Examiner* — Karla Hawkins
(74) *Attorney, Agent, or Firm* — Alston & Bird LLP (57) ABSTRACT

Systems and apparatuses are described that collect dust from the air in a manner that maximizes the volume of air that can be cleaned, while allowing for easier transport of the dust-collecting apparatus to the installation site and improving distribution of air flow within the apparatus so as to provide for a more efficient filtration of the air. In particular, the dust-collecting apparatus includes first and second housing modules that are designed to be joined longitudinally to create a housing. The module having an inlet opening of the apparatus further includes an inlet baffling system that includes multiple baffle plates near the inlet opening that facilitate a cross flow air profile for the air entering the housing. Other components, including a target plate, a baffle support structure having support plates and cross supports, and hopper baffles, may also be provided to secure the baffle plates and enhance the airflow distribution.

29 Claims, 13 Drawing Sheets

DUST-COLLECTING SYSTEMS AND APPARATUSES

FIELD OF THE INVENTION

The present invention relates generally to systems and apparatuses for collecting dust using a dust-collecting housing, as well as systems and apparatuses for promoting efficient airflow within the housing.

BACKGROUND

Conventional self-cleaning dust collectors of the described type typically comprise a sheet metal housing that is divided by a transverse panel having a plurality of rows of openings therein, and so that the panel defines a lower air inlet chamber and an upper air outlet chamber. Cylindrical filter elements, such as fabric filter bags or cartridge filters, are mounted so as to be in registry with the openings and depend downwardly into the inlet chamber. In operation, the dust-laden air enters the inlet chamber, the entrained particles are deposited on the outside surfaces of the filter bags, and the filtered air flows upwardly through the inside of the bags and is discharged through the upper outlet chamber.

Such dust-collecting apparatuses are typically installed on-site at industrial and manufacturing facilities where there is a need to remove dust and other contaminants from the air. Facilities where dust collection is typically required include power and steam generation sites, cement manufacturing sites, iron and steel mills, mining facilities, chemical and petro-chemical facilities, and glass manufacturing sites, among others. Due to the size of these facilities, the nature of the manufacturing processes, and the high output of product involved, a substantial volume of particles and other contaminants are produced that must be removed from the environment and addressed.

Accordingly, there is a need in the art for systems and apparatuses that can efficiently process greater volumes of contaminated air and yet can be transported to the installation site in a simple and cost-effective manner.

BRIEF SUMMARY OF EXAMPLE EMBODIMENTS

Accordingly, embodiments of systems and apparatuses are described that maximize the volume of air that can be cleaned, while allowing for easier transport of the dust-collecting apparatus to the installation site and improving the distribution of air flow within the apparatus so as to provide for a more efficient filtration of the air. In some embodiments, a dust-collecting apparatus is provided that includes first and second housing modules configured to be joined longitudinally to create a housing having a transverse panel dividing the housing into an inlet chamber and an outlet chamber, with the panel having a plurality of openings therein. The dust-collecting apparatus may further include a plurality of elongate filter elements each having an open end and a closed end, with the filter elements being mounted to the panel such that the open ends are in registry with respective ones of the openings in the panel and the filter elements extend into the inlet chamber. A reverse pulse cleaning apparatus may also be provided that is configured for periodically directing a reverse pulse of air through each of the panel openings and into the open ends of the respective filter elements.

One of the housing modules may include an inlet opening that communicates with the inlet chamber for admitting dust-laden air, and one of the housing modules may include an outlet opening that communicates with the outlet chamber for exhausting clean air. The housing module that includes the inlet opening may further include an inlet baffling system comprising a plurality of baffle plates disposed proximate the inlet opening and which are configured to facilitate a cross flow air profile for the dust-laden air. The baffle plates may be spaced apart from each other, and each baffle plate may have a substantially vertical orientation such that a direction of flow of the dust-laden air is substantially parallel to a planar surface of the baffle plate.

In some cases, the apparatus may further comprise a target plate located in the inlet chamber, proximate respective trailing edges of the baffle plates, and the target plate may be oriented such that it is substantially perpendicular to the baffle plates. The baffle plates may be attached to the target plate.

The inlet baffling system may include a baffle support structure to which at least one of the baffle plates is attached, and the baffle support structure may be configured to secure the baffle plates to the housing module having the inlet opening and to position the baffle plates relative to the inlet opening. The baffle support structure may comprise a plurality of support plates and a plurality of cross supports attached to the support plates. The support plates may be spaced apart from each other, and each support plate may have a substantially vertical orientation such that a direction of flow of the dust-laden air is substantially parallel to a planar surface of the support plate. Furthermore, the cross supports may be spaced apart from each other, and each cross support may have a substantially horizontal orientation such that each cross support is substantially perpendicular to the support plates.

In some cases, a bottom portion of the first and second housing modules may further define a hopper configured to collect dust particles. The housing module having the inlet opening may further include at least one hopper baffle disposed in the hopper that is configured to direct dust-laden air toward the outlet chamber. Each hopper baffle may be attached to a surface of the hopper below the inlet opening, and each hopper baffle may extend across an entire width of the surface.

In other embodiments, an inlet-side housing module for use in a dust-collecting apparatus is provided, where the module comprises a portion of a transverse panel dividing the module into a portion of an inlet chamber and a portion of an outlet chamber, with the portion of the transverse panel having a plurality of openings therein, the openings configured to receive a plurality of elongate filter elements. The module may further comprise an inlet opening that communicates with the portion of the inlet chamber for admitting dust-laden air and an inlet baffling system comprising a plurality of baffle plates disposed proximate the inlet opening and which are configured to facilitate a cross flow air profile for the dust-laden air.

The baffle plates may be spaced apart from each other, and each baffle plate may have a substantially vertical orientation such that a direction of flow of the dust-laden air is substantially parallel to a planar surface of the baffle plate. The inlet-side housing module may further comprise a target plate located in the portion of the inlet chamber, proximate respective trailing edges of the baffle plates, and the target plate may be oriented such that it is substantially perpendicular to the baffle plates. The baffle plates may, in some cases, be attached to the target plate.

The inlet baffling system may include a baffle support structure to which at least one of the baffle plates is attached, and the baffle support structure may be configured to secure the baffle plates to the inlet-side housing module and to position the baffle plates relative to the inlet opening. The support structure may comprise a plurality of support plates and a plurality of cross supports attached to the support plates. The support plates may be spaced apart from each other, and each support plate may have a substantially vertical orientation such that a direction of flow of the dust-laden air is substantially parallel to a planar surface of the support plate. Furthermore, the cross supports may be spaced apart from each other, and each cross support may have a substantially horizontal orientation such that each cross support is substantially perpendicular to the support plates.

In some cases, a bottom portion of the inlet-side housing module may further define a portion of a hopper configured to collect dust particles. At least one hopper baffle may be provided in the portion of the hopper, and the hopper baffle may be configured to direct dust-laden air toward the portion of the outlet chamber. Each hopper baffle may be attached to a surface of the portion of the hopper below the inlet opening, and each hopper baffle may extend across an entire width of the surface.

BRIEF DESCRIPTION OF THE DRAWINGS

Having thus described the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. Some components of the dust-collecting apparatus and associated systems are not shown in one or more of the figures for clarity and to facilitate explanation of embodiments of the present invention.

As used herein, the terms "bottom," "top," "upper," "lower" and similar terms are used for ease of explanation and refer generally to the position of certain components of embodiments of the described invention in the installed configuration (e.g., in an operational configuration). It is understood that such terms are not used in any absolute sense, and, as such, a component described as a "bottom portion" may be on the same level (e.g., at the same distance from the ground) as another component described as a "top portion" in certain configurations of embodiments of the described invention, such as when the housing modules are being transported to the installation site, as described below. Moreover, in the description and examples provided herein, the term "dust" is used to refer to any particulates or contaminants in the air or any other gas stream that are capable of being removed to some degree via mechanical or physical separation, such as by using one or more filters.

Conventional dust-collecting apparatuses are structures that hold one or more filters. On a very basic level, these structures are arranged such that dust-laden air may be directed into one end of the apparatus and moved through the filters where the dust (or some percentage of the dust) is removed. The cleaned air may then be exhausted from another end of the structure, for example, for safe release into the environment.

Depending on the particular application, which may dictate the volume of gas that is desired to be cleaned and the degree of contamination of the gas, a larger or smaller number of filters may be required to achieve a desired level of dust removal. In the case of heavy dust contamination and large gas flow requirements, additional dust-collecting apparatuses may be needed. With each additional structure that is needed, however, more space is required to allow the structure to be installed, including space for the necessary ductwork and integration into the facility's systems. Providing more real estate for additional installations can be costly to a facility, and in cases where the dust-collection requirements have grown and the facility is already established, such additional real estate may simply be unavailable.

Alternatively, larger dust-collecting structures may be provided to accommodate greater dust-collection requirements. By providing a dust-collecting structure that is taller, as well as having a greater width and depth, dust-collecting capacity may be increased with a smaller impact on the real estate required.

Larger dust-collecting apparatuses, however, present their own challenges. Due to the size of such structures, which according to embodiments of the present invention described below, may be upwards of 40 feet tall (e.g., 45 feet to 50 feet tall) and may have dimensions in the range of 10 feet by 20 feet to 15-feet by 25-feet when installed, the transportation of the housing of the dust-collecting apparatus from the manufacturing site to the installation site can be difficult, if not impossible.

For conventional dust-collecting apparatuses, which are typically half the size of embodiments of the present invention, one way the transportation issue is addressed is by manufacturing the housing in two or more portions that are separately transported to the installation site and stacked one on top of the other to form a completed structure. In other words, the individual housing portions are designed to be joined transversely (e.g., along horizontal edges with respect to the installed position). Due to design requirements with respect to the inlet, the outlet, and other components of the assembled structure, transverse divisions of the housing have been found to require more effort in assembling the structure at the installation site, as certain components may not be manufactured ahead of time (e.g., at the manufacturing facility). As a result, it may not be possible to maintain the same level of precision and accuracy for the components that are built and incorporated into the housing at the installation site at the time of assembly as compared to the components that are built as part of the housing in the controlled environment of the manufacturing facility.

In addition, the increased size of the dust-collecting apparatus in accordance with embodiments of the present invention described below may create dead space within the structure, such that airflow entering through the inlet may not be evenly distributed to all filters housed within the structure. Poor airflow distribution can lead to some filters being consumed faster than other filters and may result in inefficient removal of the dust particles from the air and/or more frequent maintenance to the dust-collecting apparatus, such as to change dirty filters, which increases the cost of operation and may disrupt the facility's processes.

Accordingly, embodiments of the present invention provide for apparatuses and systems for collecting dust from the air or other gas stream in a manner that maximizes the volume of air that can be cleaned, while allowing for easier transport of the dust-collecting apparatus to the installation site, providing for more of the components of the apparatus to be manufactured at the manufacturing site as opposed to in the field at the installation site, and improving the distribution of air flow within the apparatus so as to provide for a more efficient filtration of the air.

Figure 1:
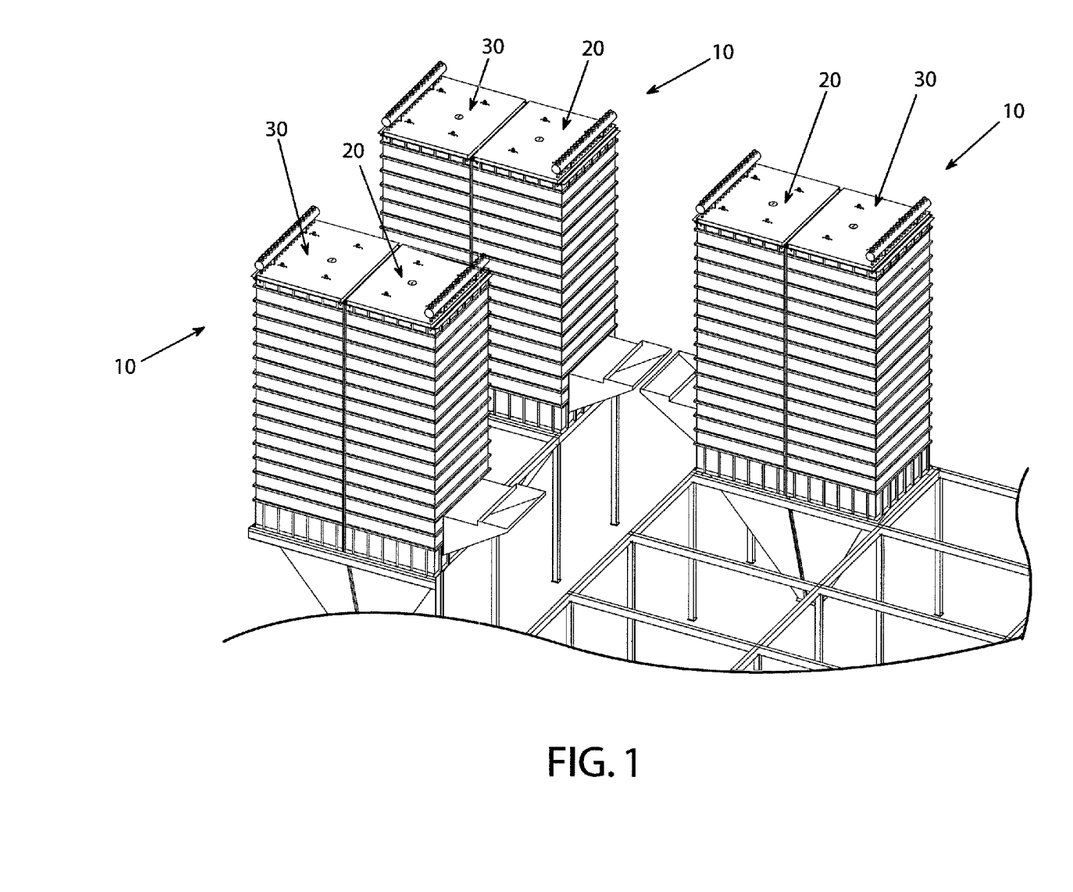
FIG. 1 shows a perspective view of a group of dust-collecting apparatuses in an installed configuration in accordance with an exemplary embodiment of the present invention.

Referring now to FIG. 1, dust-collecting apparatuses 10 are illustrated in an installed configuration according to one embodiment of the present invention. The dust-collecting apparatuses 10 may be installed, for example, on-site at a cement plant, a steel mill, or any other facility that has a need for removing dust from the air.

Figure 2:
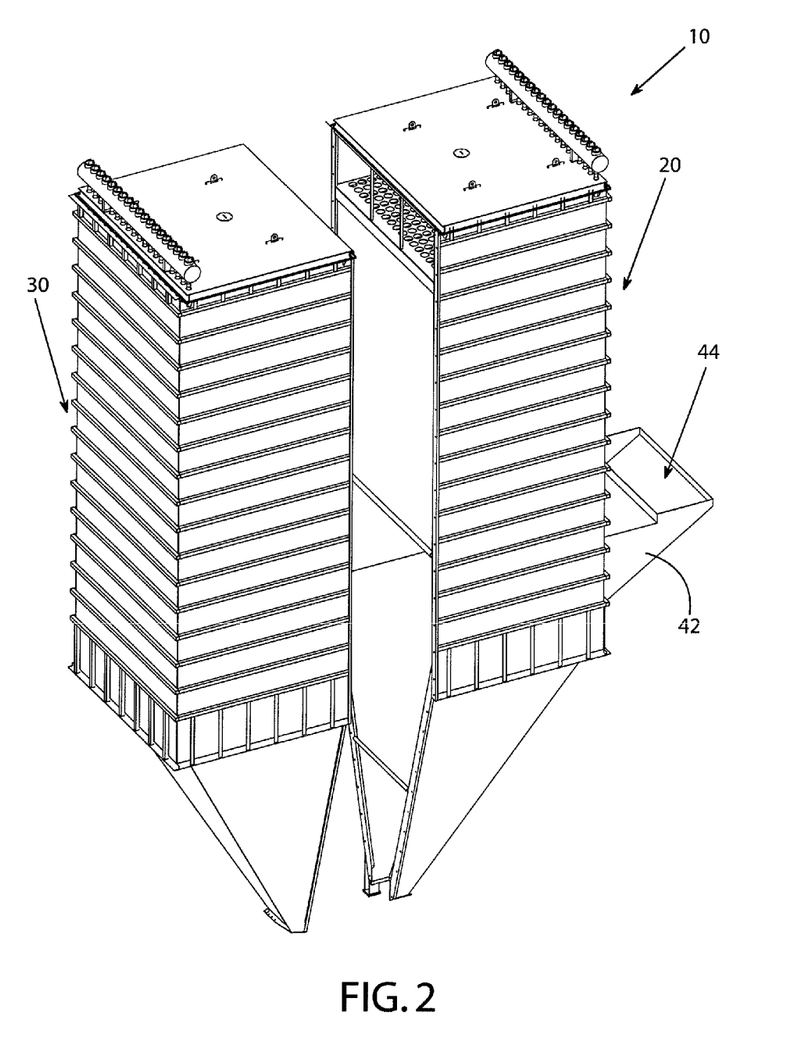
FIG. 2 shows an exploded perspective view of first and second housing modules of a dust-collecting apparatus in accordance with an exemplary embodiment of the present invention.
Figure 3:
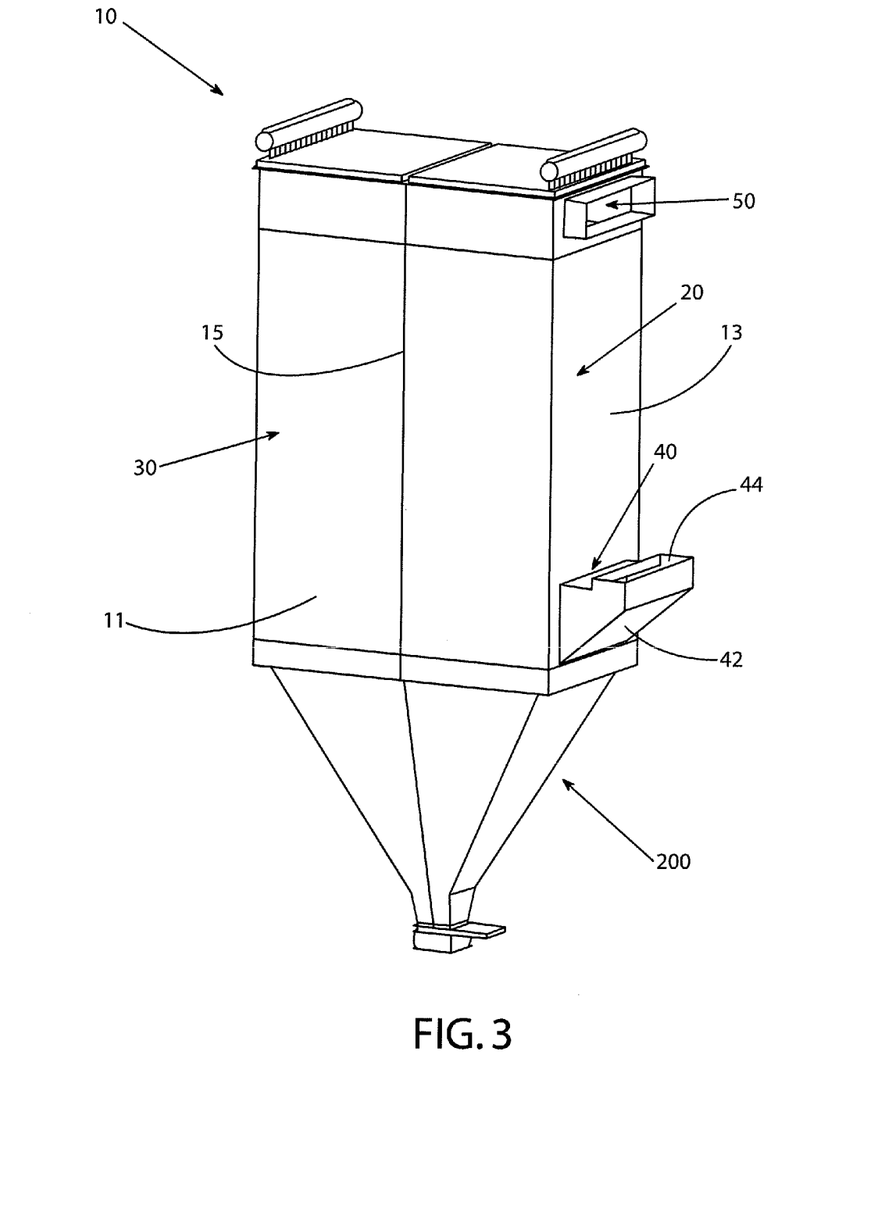
FIG. 3 shows a simplified perspective view of the first and second housing modules of FIG. 2 assembled to form the dust-collecting apparatus in accordance with an exemplary embodiment of the present invention.
Figure 5:
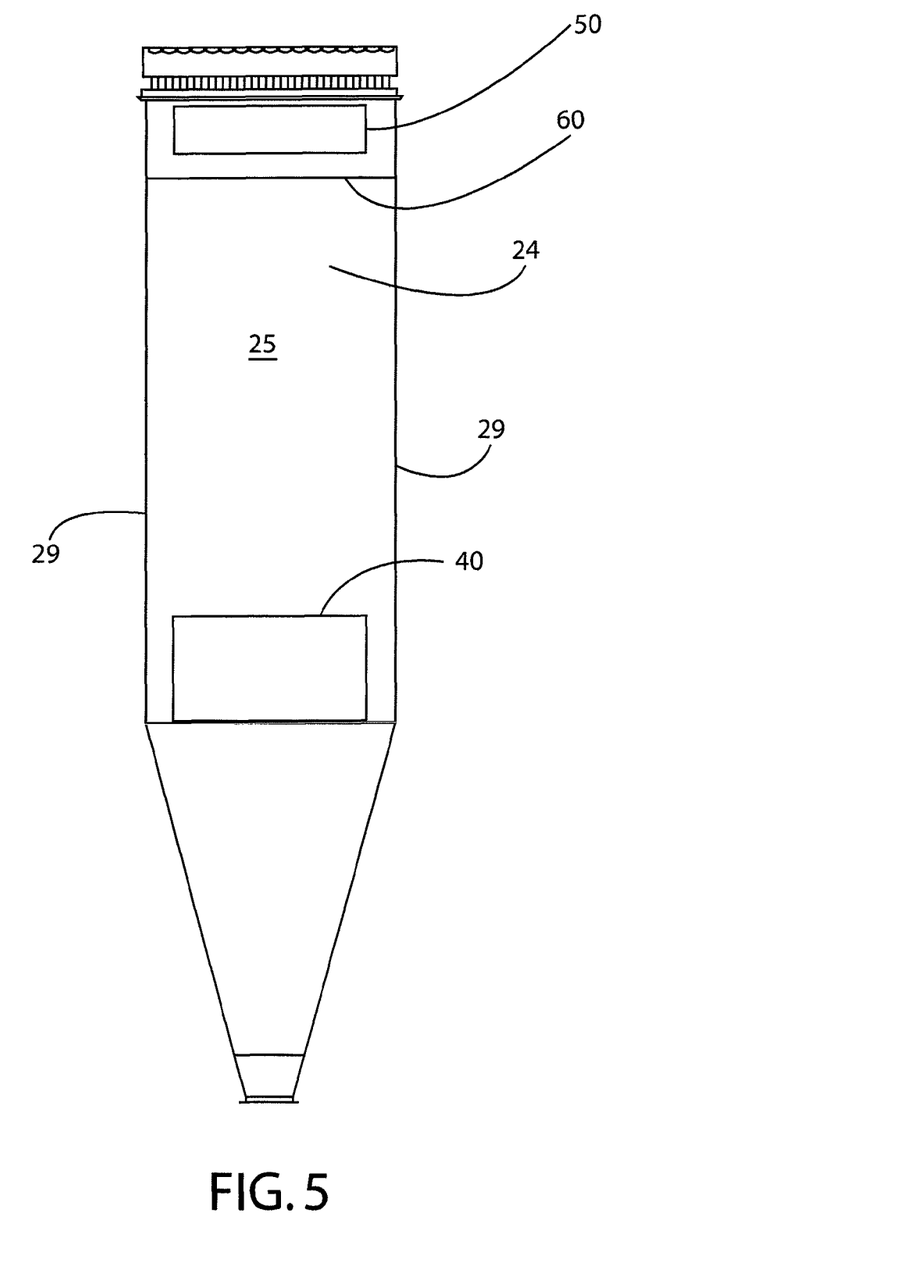
FIG. 5 shows a simplified cross sectional view of the interior of the inlet-side housing module of FIG. 4 in accordance with an exemplary embodiment of the present invention.

Each dust-collecting apparatus 10 may include a first housing module 20 and a second housing module 30, where the first and second housing modules are configured to be joined to each other longitudinally to create a unitary housing. Turning to FIGS. 2, 3, and 5, for example, one of the housing modules may include an inlet opening 40, and one of the housing modules may include an outlet opening 50. In the depicted embodiment, the inlet opening 40 and the outlet opening 50 are both defined by the first housing module 20; however, in other cases, both openings may be defined by the second housing module 30, or each housing module may define a different one of the openings. Accordingly, in the depicted embodiment, the first housing module 20 that includes the inlet opening 40 may be referred to as an inlet-side housing module 20. An inlet extension 42 may be attached to the inlet-side housing module 20, such that air may flow into an opening 44 of the inlet extension, through the inlet extension, and into the housing.

Figure 4:
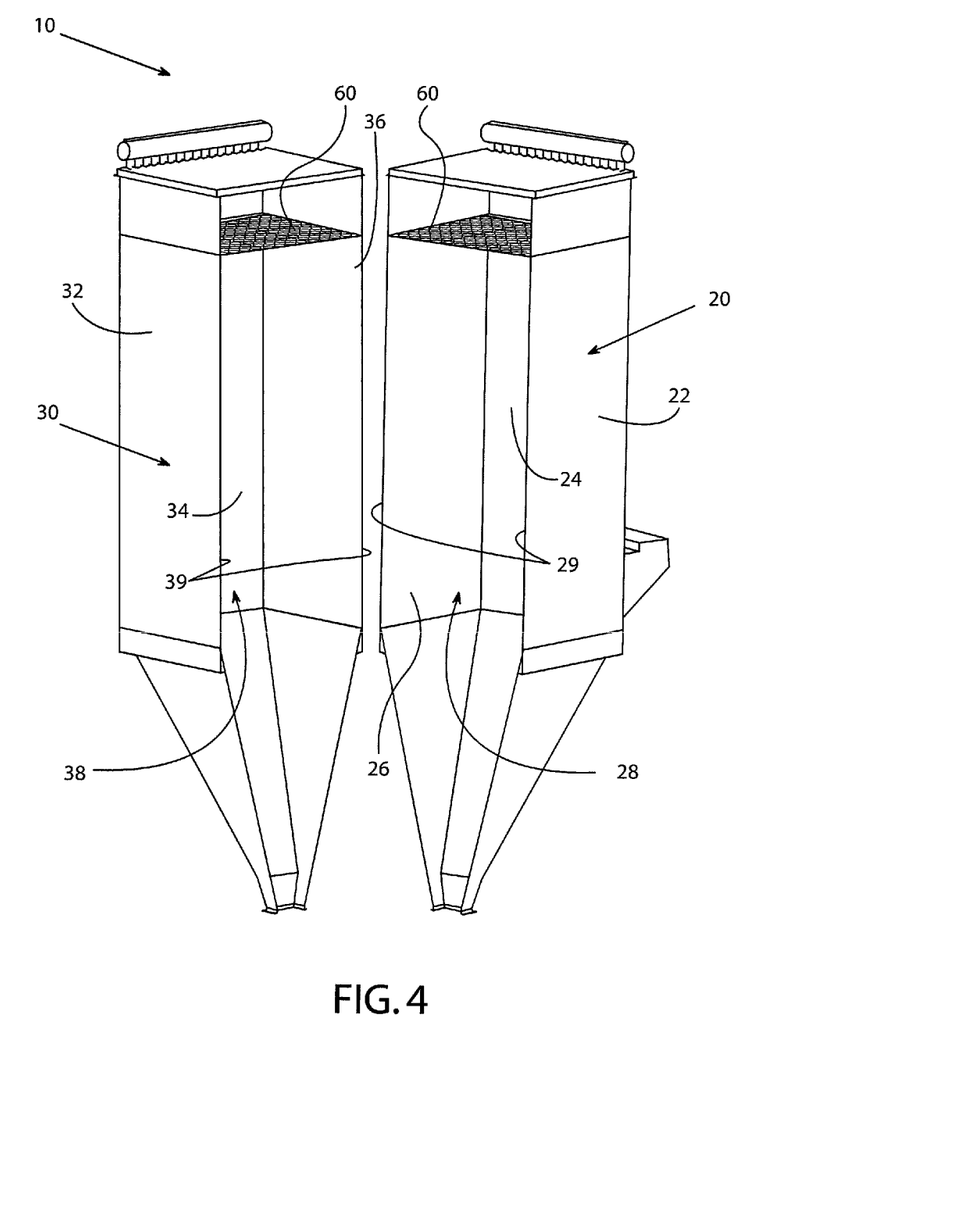
FIG. 4 shows a simplified perspective view of the interiors of the first and second housing modules of FIG. 3 in accordance with an exemplary embodiment of the present invention.

Turning to FIG. 4, each of the first and second housing modules 20, 30 may include three walls 22, 24, 26, 32, 34, 36. An open side 28, 38 of each housing module 20, 30 may be defined by a longitudinal edge 29, 39 that extends around the perimeter of the respective open side. The longitudinal edges 29, 39 may, in turn, be configured to be joined to each other for assembling the two housing modules 20, 30 into a complete housing for the dust-collecting apparatus 10. In other words, the longitudinal edges 29, 39, in essence, serve to divide the housing of the dust-collecting apparatus longitudinally (e.g., from a top end 12 of the apparatus down to a bottom end 14 of the apparatus).

Thus, unlike a conventional dust-collecting apparatus which may be transversely divided into two or more portions for transport with the portions being assembled at the installation site in a stacked fashion (one on top of the other), embodiments of the present invention are configured such that the first and second housing modules 20, 30 are assembled by placing the two modules side-by-side, with respective longitudinal edges 29, 39 adjoining. In this way, in an assembled housing of the apparatus 10 (shown in FIG. 3, for example), the walls 22, 32 form a front wall 11, the wall 24 of the first housing module forms a side wall 13 of the apparatus, the walls 26, 36 form a rear wall of the apparatus (not shown in FIG. 3), and the wall 34 of the second housing module forms the other side wall of the apparatus (not shown in FIG. 3).

Figure 6:
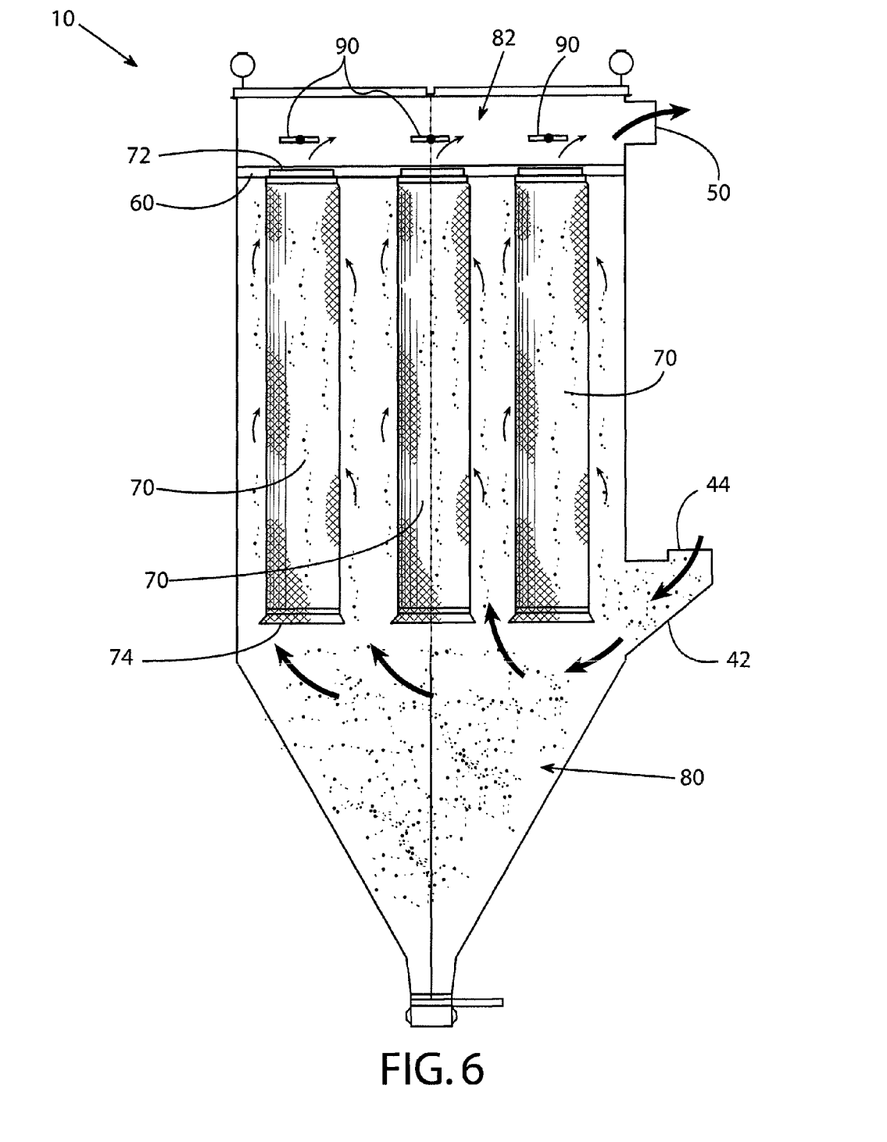
FIG. 6 shows a simplified schematic representation of a cross-section of the dust-collecting apparatus of FIG. 3 including elongate filter elements in accordance with an exemplary embodiment of the present invention.

FIG. 5 illustrates a cross-sectional view of the inlet-side housing module looking at an interior surface 25 of the housing module (i.e., via the open side 28 of FIG. 4), and FIG. 6 shows a simplified illustration of an assembled dust-collecting apparatus 10, including a plurality of elongate filter elements 70. Thus, although FIG. 6 shows a row of three filter elements 70, embodiments of the present invention may have several rows each having 15 to 30 or more filter elements.

With reference to FIGS. 5 and 6, the housing (made up of the first and second housing modules 20, 30) may have a transverse panel 60 dividing the housing into an inlet chamber 80 and an outlet chamber 82. The transverse panel 60 may define a plurality of openings 62 therein. As noted above, dust-laden air may enter inlet chamber 80 of the housing via the opening 44 of the inlet extension 42 and the inlet opening 40 defined in the wall 24 (FIG. 4). Each of the elongate filter elements 70 may have an open end 72 and a closed end 74, and the filter elements may be mounted to the transverse panel 60 such that the open ends are in registry with respective ones of the openings 62 in the panel. The filter elements 70 may extend into the inlet chamber 80, such that as the dust-laden air is passed through the filter elements, the dust is caught on an outside surface of the filter elements and clean air is moved up through the filter elements and into the outlet chamber 82 via the respective open ends 72 of the filter elements and the corresponding openings 62 of the transverse panel 60. The clean air may then be exhausted from the outlet chamber 82 via the outlet opening 50.

In some cases, a reverse pulse cleaning apparatus 90 may be provided that is configured for periodically directing a reverse pulse of air through each of the panel openings 62 and into the open ends 72 of the respective filter elements 70. The reverse pulse of air may serve to dislodge dust particles caught on the outer surface of the filter elements and allow the particles to fall to the bottom of the inlet chamber, where they may be collected and removed, thereby "cleaning" the filter elements 70 and allowing more dust to be captured by the respective filter elements. A reverse pulse cleaning apparatus is described, for example, in U.S. Pat. No. 5,395,409, the contents of which are hereby incorporated by reference.

As noted above, embodiments of the present invention allow for manufacturing housing modules that, when assembled at the installation site, form a dust-collecting apparatus that can be about twice as large as conventional dust-collecting apparatuses. For example, a dust-collecting apparatus according to embodiments of the present invention may stand approximately 50 feet tall, approximately 24 feet wide, and approximately 14 feet deep when installed. Accordingly, with reference to FIGS. 7-10A, the inlet-side housing module 20 may include an inlet baffling system 100 that includes a plurality of baffle plates 110 disposed proximate the inlet opening 40. The baffle plates may be configured to facilitate a cross flow air profile for the dust-laden air, as described below.

Figure 8:
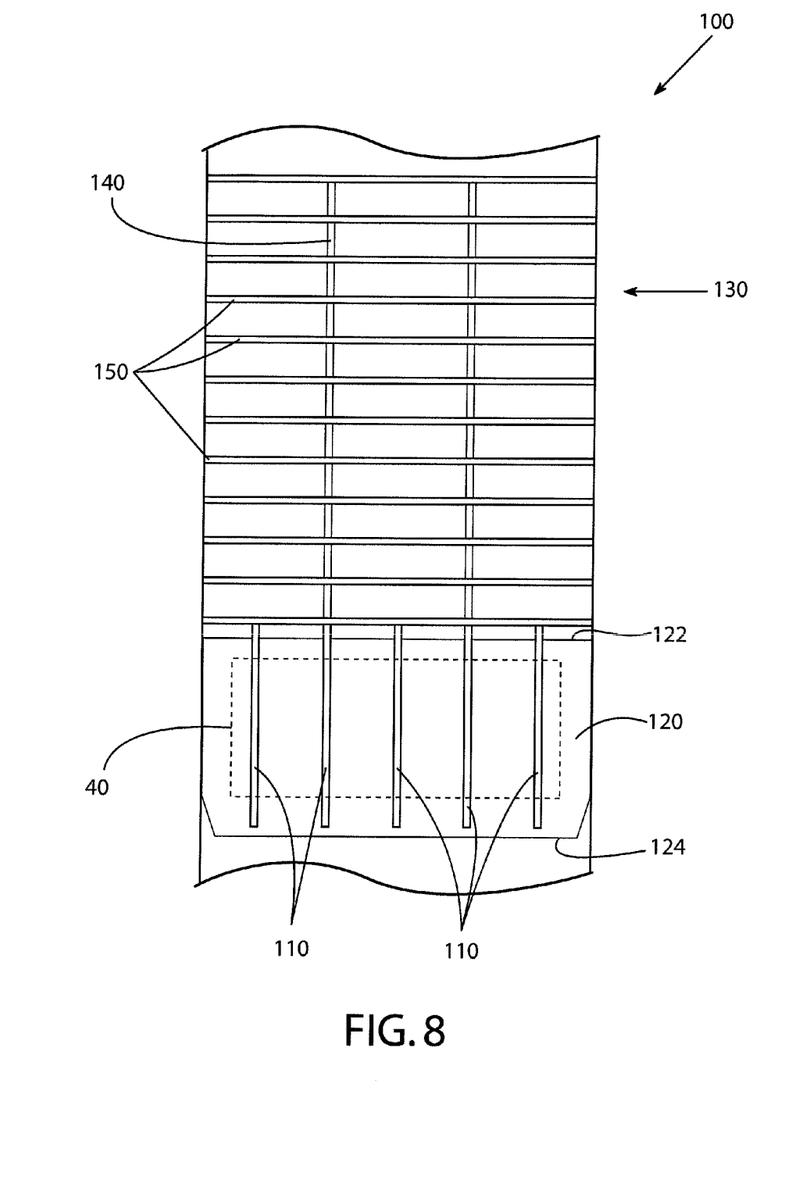
FIG. 8 shows a simplified schematic view of the inlet baffling system of FIG. 7, including a target plate, from an inlet-side of the housing with the inlet-side wall removed in accordance with an exemplary embodiment of the present invention.
Figure 9:
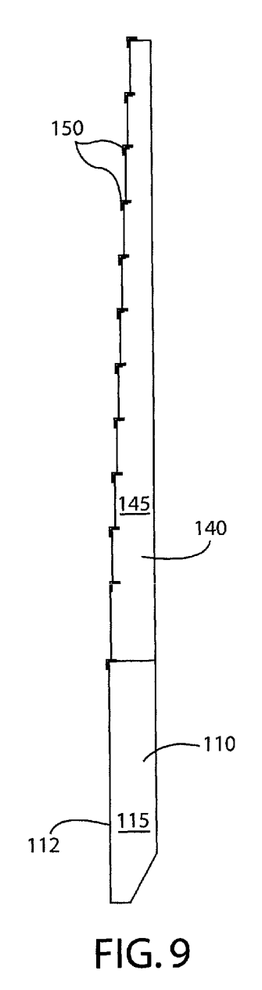
FIG. 9 shows a side view of a baffle plate, a support plate, and cross supports of the inlet baffling system of FIGS. 7 and 8 in accordance with an exemplary embodiment of the present invention.
Figure 14:
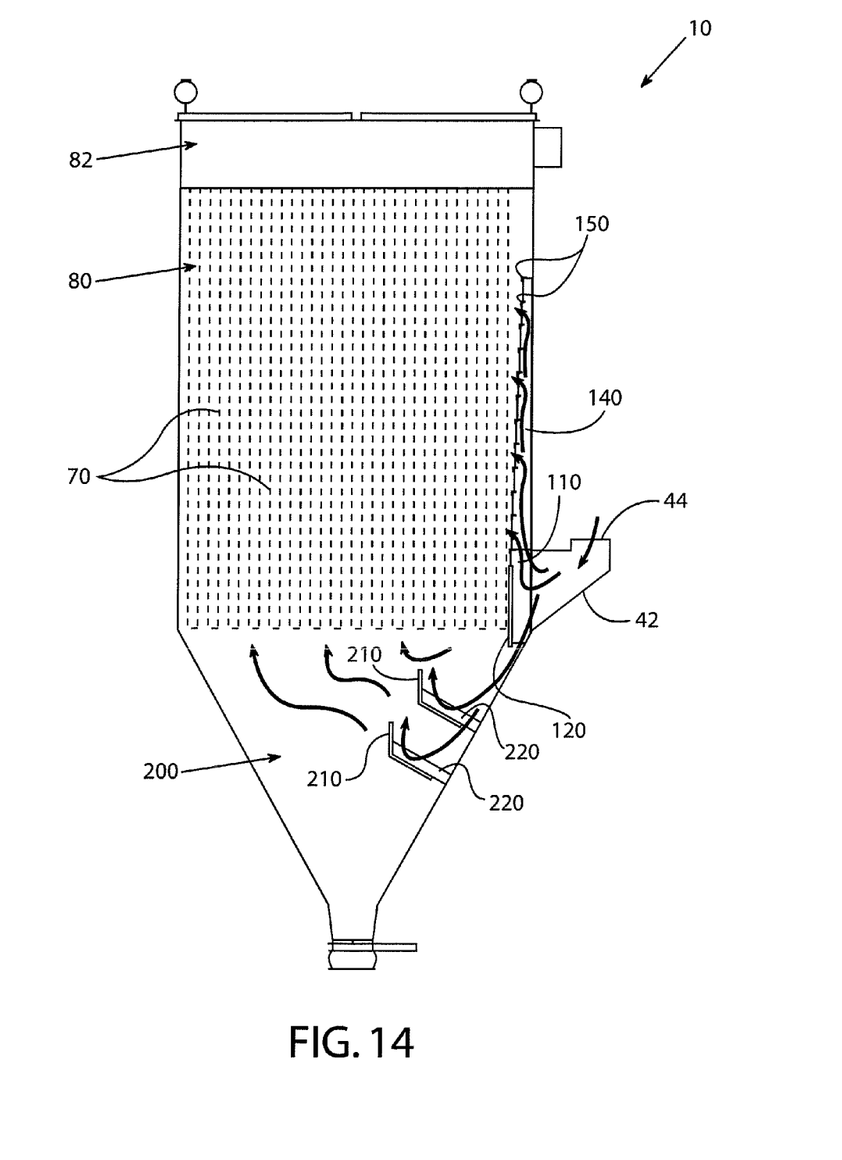
FIG. 14 is a schematic representation of a cross flow air profile in accordance with an exemplary embodiment of the present invention.

Referring to FIG. 8, for example, which shows the location of the inlet opening 40 in dashed lines, the baffle plates 110 may be spaced apart from each other, and each baffle plate may have a substantially vertical orientation such that a direction of flow of the dust-laden air is substantially parallel to a planar surface 115 (shown in FIGS. 9 and 10) of the baffle plate. A schematic representation of the airflow is shown in FIG. 14, where the airflow is represented by arrows.

In some cases, a target plate 120 (shown in FIG. 8) may be provided in the inlet chamber 80, proximate respective trailing edges 112 (FIGS. 7, 9, and 10) of the baffle plates 110. The target plate 120 may be attached to the respective trailing edges 112 of the baffle plates 110, such as via welding, and may be positioned adjacent one or more of the filter elements 70 (represented in FIG. 14 by dashed lines). Thus, the target plate 120 may be oriented such that it is substantially perpendicular to the orientation of the baffle plates 110. In this way, the target plate 120 may partially protect the filter elements 70 from the airflow entering the inlet chamber 80 via the inlet opening 40, such that the air must flow up and over a top edge 122 of the target plate toward the filter elements or down and under a bottom edge 124 of the target plate.

Figure 7:
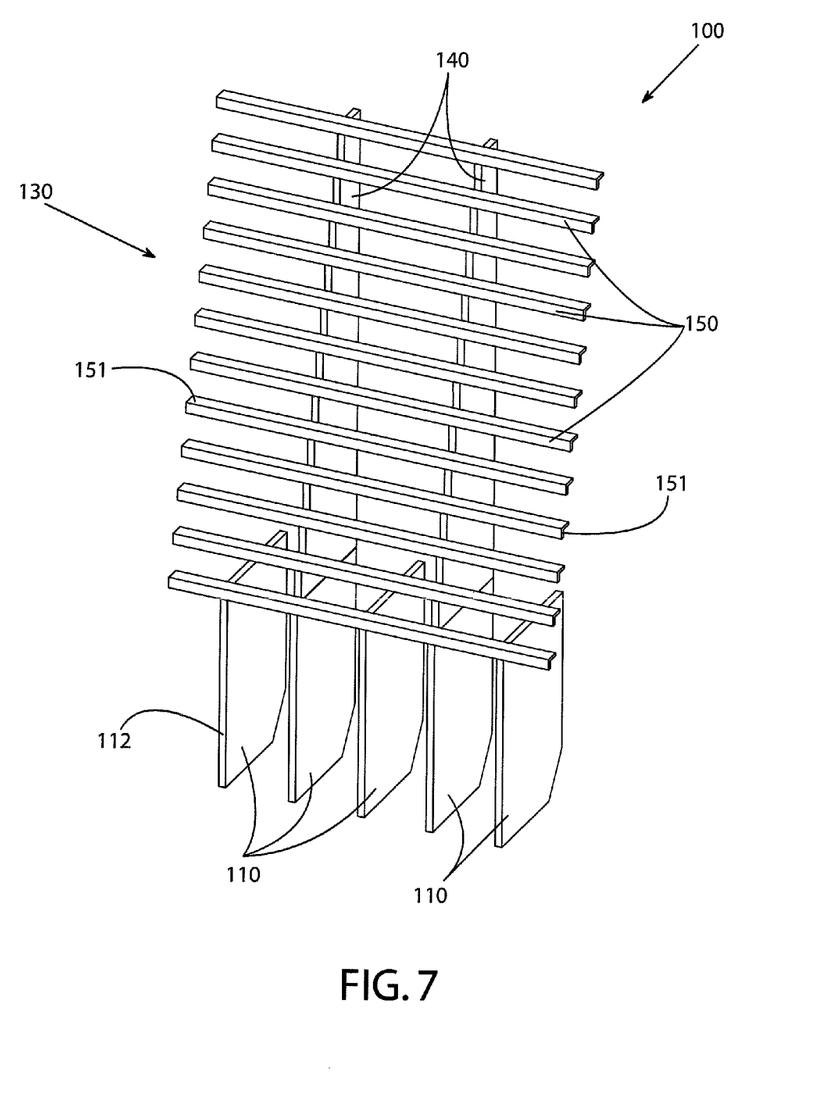
FIG. 7 shows a perspective view of an inlet baffling system including a baffle support structure in accordance with an exemplary embodiment of the present invention.

In some embodiments, the inlet baffling system 100 further includes a baffle support structure 130 to which at least one of the baffle plates 110 is attached, as shown in FIGS. 7 and 8. The baffle support structure 130 may be configured to secure the baffle plates 110 to the housing module having the inlet opening 40 (e.g., the inlet-side housing module 20 of FIG. 5) and to position the baffle plates relative to the inlet opening. For example, the total weight of the inlet baffling system 100 may be over 1000 pounds. The baffle support structure 130 may thus be configured to provide adequate surface area for attachment of the inlet baffling system 100 to the respective wall 24 defining the inlet opening 40, for example via welding.

In this regard, the baffle support structure 130 may include a plurality of support plates 140 and a plurality of cross supports 150 attached to the support plates. In the embodiment depicted in FIGS. 7 and 8, for example, two support plates 140 are provided along with twelve cross supports 150 for securing and positioning five baffle plates 110, although the number of each component may vary according to the size of the dust-collecting apparatus, the airflow requirements, and other considerations. In the depicted embodiment, the two support plates 140 are aligned with and welded to the second and fourth baffle plates 110, and a lowermost cross support 150 is provided for attaching the first, third, and fifth baffle plates to the lowermost cross support. In addition, in some embodiments, the target plate 120, via attachment to the trailing edges 112 of the baffle plates 110, also serves to maintain the baffle plates in place and to provide stability and support to the inlet baffling system 100.

Accordingly, the support plates 140 may be spaced apart from each other, and each support plate may have a substantially vertical orientation, such that a direction of flow of the dust-laden air is substantially parallel to a planar surface 145 of the support plates (FIG. 14). Furthermore, the cross supports 150 may be spaced apart from each other, and each cross support may have a substantially horizontal orientation such that each cross support is substantially perpendicular to the support plates 140. The cross supports 150 may extend between opposing walls 22, 26 (FIG. 4) of the inlet-side housing module 20, such that side edges 151 (FIG. 7) may be welded or otherwise attached to the opposing walls for additional support of the inlet baffling system 100.

Figures 10, 10A:
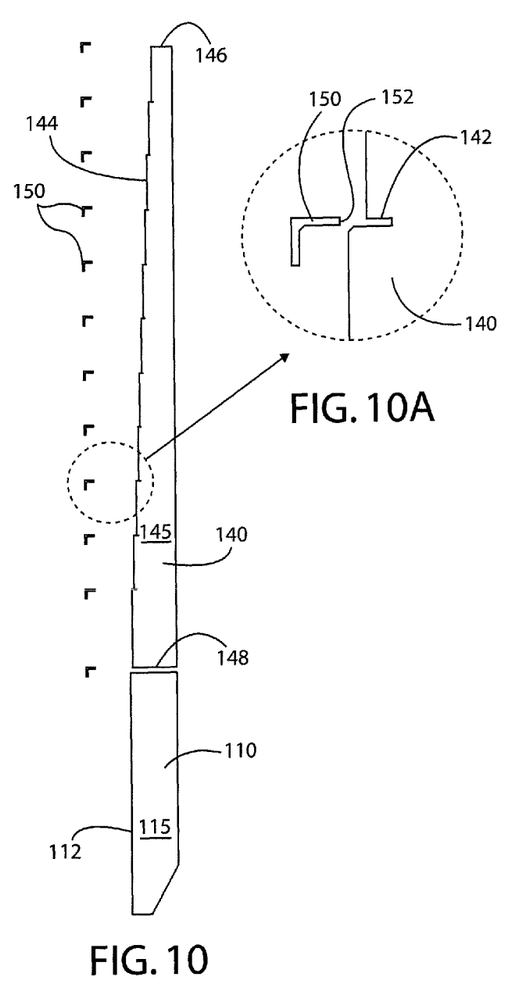
FIG. 10 shows an exploded side view of the baffle plate, support plate, and cross supports of FIG. 9 in accordance with an exemplary embodiment of the present invention.
FIG. 10A shows a close-up side view of a portion of a support plate and a cross support in accordance with an exemplary embodiment of the present invention.

Referring to FIG. 10A, for example, the cross supports 150 may be configured with an approximately 90° bend and may thus have an "L" shape. Each support plate 140, in turn, may define a notch 142 configured to receive a leading edge 152 of the cross support 150. Moreover, each support plate 140 may define a trailing edge 144 that defines a stepped profile, such that a top edge 146 of the support plate is shorter than a bottom edge 148 of the support plate. The stepped profile of the trailing edge 144 of the support plate 140, in addition to facilitating the engagement of the cross supports 150 with the support plate, may also serve to reduce or eliminate any vibration that could be caused by vortex shedding at the top edge 146 of the support plate. In other words, the overall angle of the stepped profile may be selected so as to maintain a close velocity profile and control the uniform distribution of airflow at the wall 24 defining the inlet opening, preventing high velocity streamlining below the baffle plates 110.

Figure 11:
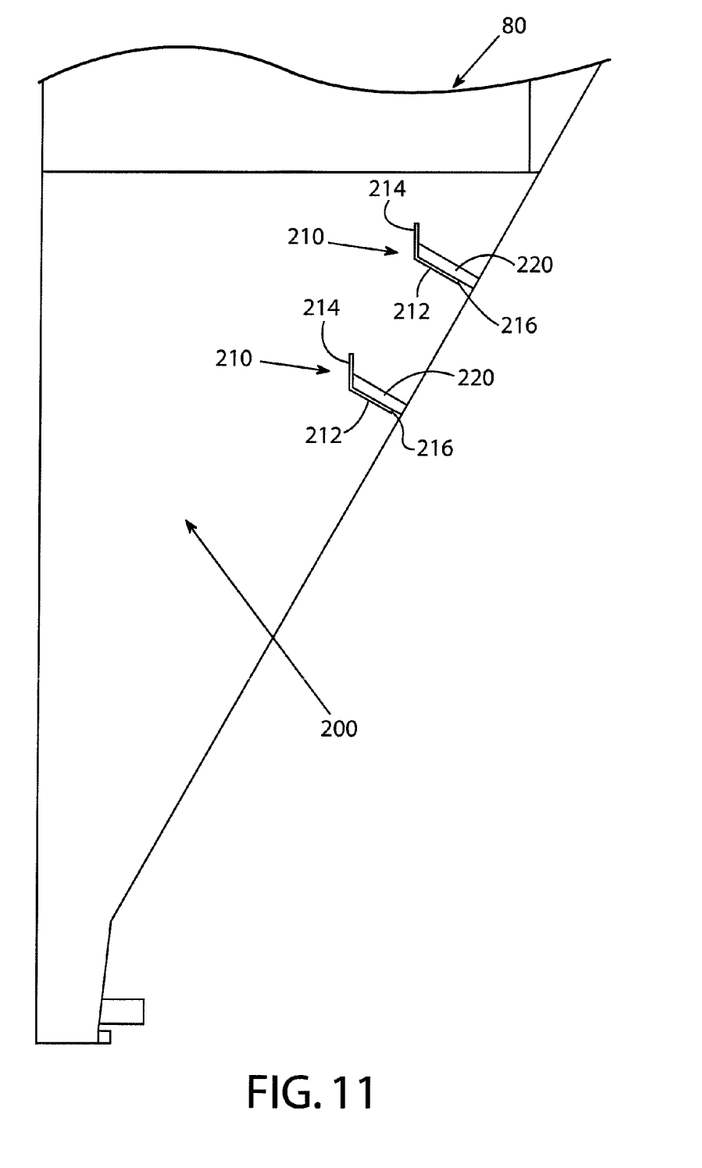
FIG. 11 shows a side view of a hopper including hopper baffles in accordance with an exemplary embodiment of the present invention.
Figure 12:
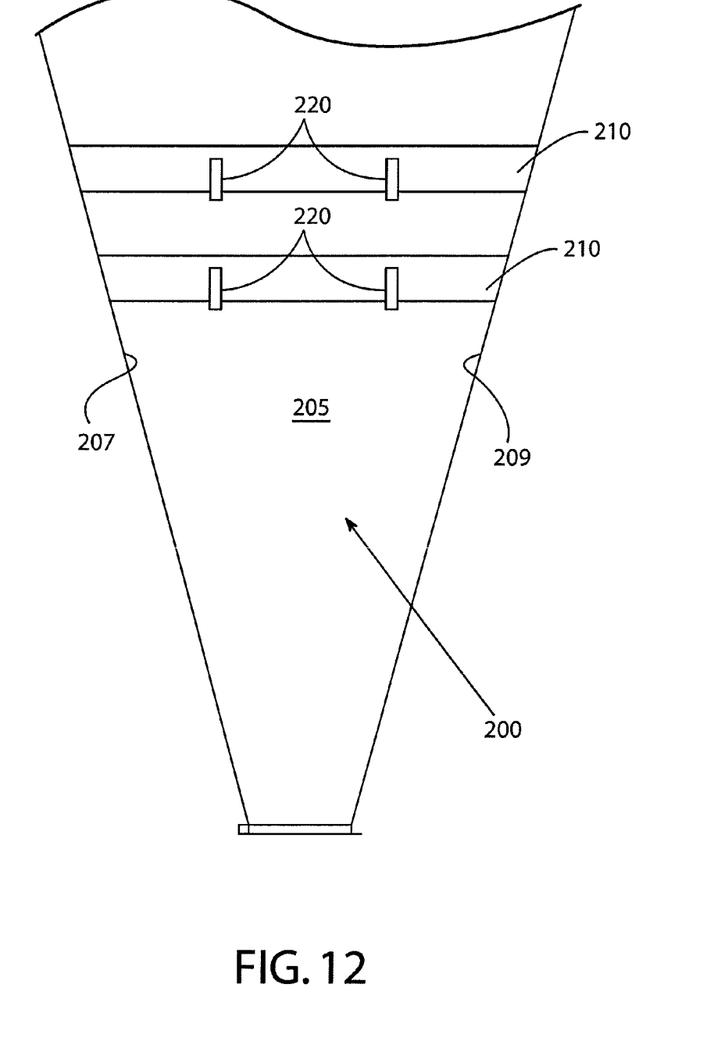
FIG. 12 shows a front view of the hopper baffles of FIG. 11 in accordance with an exemplary embodiment of the present invention.
Figure 13:
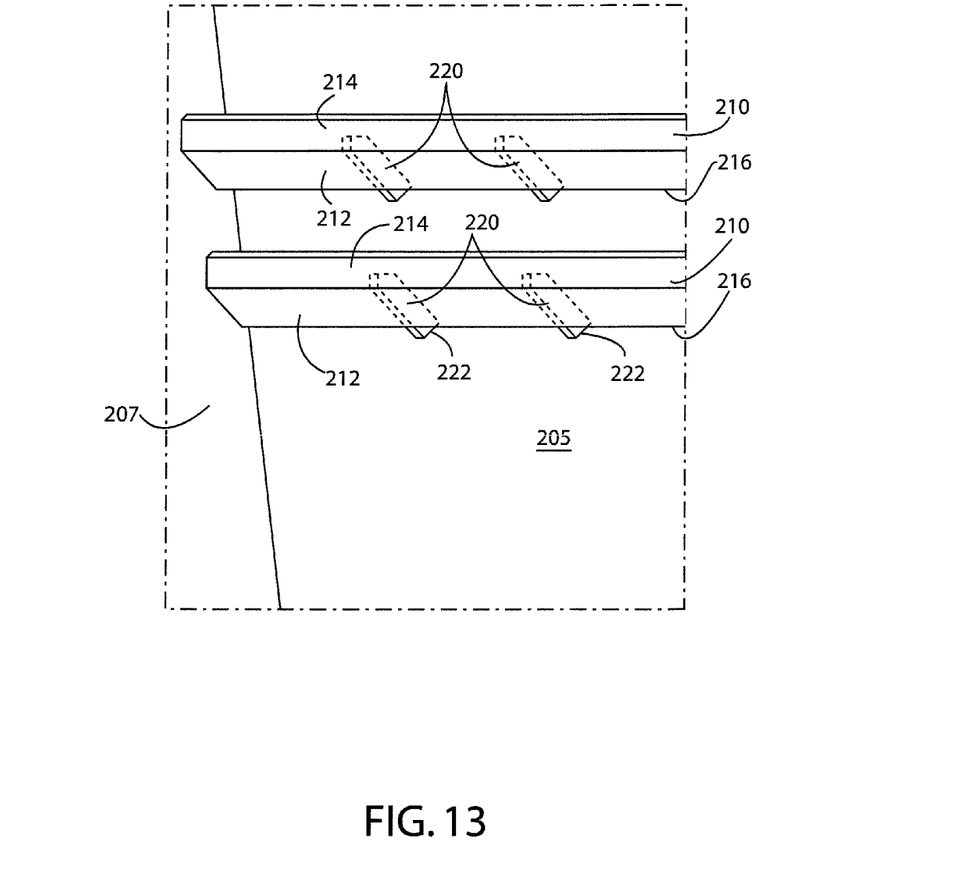
FIG. 13 shows a perspective view of the hopper baffles of FIG. 11 in accordance with an exemplary embodiment of the present invention.

Referring again to FIG. 3, in some embodiments, a bottom portion 200 of the first and second housing modules 20, 30 may further define a hopper configured to collect dust particles, as described above. The housing module having the inlet opening 40 (e.g., the inlet-side housing module 20) may further include at least one hopper baffle 210 that is configured to direct dust-laden air toward the outlet chamber, as shown in FIGS. 11-13. For example, in the depicted embodiment, two hopper baffles 210 are provided and are configured (e.g., sized and shaped) to build back pressure in the bottom portion 200 of the inlet chamber 80. Each hopper baffle 210 may, for example, have a first portion 212 and a second portion 214 that define an angle therebetween. The angle may be, for example, between approximately 90° and 120°. The first portion 212 may, in some cases, define an angle with the hopper inlet wall surface 205 of between approximately 80° and 120°, such as 90°; however, the particular angles, sizes, and shapes may vary depending on the actual size and configuration of the dust-collecting apparatus, the velocity of the airflow through the inlet chamber, and other variables.

Each hopper baffle 210 may be attached to a surface 205 of the hopper below the inlet opening. In addition, in some embodiments, each hopper baffle 210 may extend across an entire width of the surface 205, for example, extending between opposing side walls 207, 209 of the hopper as shown in FIG. 12. Accordingly, opposing side edges of the hopper baffles 210 may be attached, such as via welding, to the opposing side walls 207, 209.

In some cases, hopper baffle support plates 220 may be provided to attach each hopper baffle 210 to the hopper inlet wall surface 205, as best shown in FIGS. 11 and 13. The hopper baffle support plates 220 may be attached, such as via welding, to one or more surfaces of the respective hopper baffles 210, and a leading edge 222 of the hopper baffle support plate may in turn be attached to the wall surface 205. Thus, in some embodiments, a leading edge 216 of each hopper baffle 210 may be disposed at a distance (e.g., approximately 2 to 6 inches) way from the wall surface 205, as shown. In the depicted embodiment, two hopper baffles 210 are provided, and each hopper baffle is attached to two hopper baffle support plates 220; however, in other embodiments, additional or fewer hopper baffles and hopper baffle support plates may be provided, according to the specific configuration of the dust-collecting apparatus, airflow parameters, and particular performance requirements.

According to embodiments of the present invention described above, the configuration of the components, including the baffle plates 110, the support plates 140, the cross supports 150, the target plate 120, the hopper baffles 210, and/or the baffle support plates 220 and their relative positioning within the housing of the dust-collecting apparatus 10 may facilitate a cross flow air profile for the dust-laden air entering the inlet chamber, as shown in FIG. 14. Air entering through the inlet opening 40 (e.g., shown in FIG. 5) via the opening 44 of the inlet extension 42, according to embodiments of the invention, may flow across the baffle plates 110 and, upon approaching the target plate 120, may flow up and over and down and under the target plate. Some of the air that flows over the target plate 120 may continue flowing up across planar surfaces of the support plates 140 and may gradually flow toward the opposite side of the housing of the dust-collecting apparatus 10, toward and into the filter elements 70, as shown schematically in FIG. 14 via the airflow arrows. Air that flows under the target plate 120 may flow into the bottom portion 200 of the inlet chamber 80 and, upon approaching one or the other of the hopper baffles 210, may be pushed upward toward the filter elements 70 and the outlet chamber 82, at the same time moving toward the opposite side of the housing of the dust-collecting apparatus 10 (e.g., a wall opposite the wall defining the inlet opening). In this way, a cross flow profile may be established, in which dust-laden air entering via one side of the housing is distributed and moved through the inlet chamber such that the air may be received into various filter elements 70 across the width and depth of the housing, thereby facilitating the even consumption of the filter elements and promoting the efficient collection of dust from the air.

As noted above the structures and components depicted in the figures have been simplified for clarity and ease of explanation. As such, one or more of the housing walls, internal and/or external ductwork, filter elements, etc., although described above, may not be shown in the figures. In addition, many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A dust-collecting apparatus, said apparatus comprising:
first and second housing modules configured to be joined longitudinally to create a housing having a transverse panel dividing the housing into an inlet chamber and an outlet chamber, with the panel having a plurality of openings therein;
a plurality of elongate filter elements each having an open end and a closed end, with the filter elements being mounted to the panel such that the open ends are in registry with respective ones of the openings in the panel and the filter elements extend into the inlet chamber; and
a reverse pulse cleaning apparatus configured for periodically directing a reverse pulse of air through each of the panel openings and into the open ends of the respective filter elements,
wherein one of the housing modules includes an inlet opening that communicates with the inlet chamber for admitting dust-laden air and one of the housing modules includes an outlet opening that communicates with the outlet chamber for exhausting clean air, and wherein the housing module that includes the inlet opening further includes an inlet baffling system comprising a plurality of baffle plates disposed proximate the inlet opening and which are configured to facilitate a cross flow air profile for the dust-laden air, and
wherein the baffle plates are spaced apart from each other and each baffle plate has a substantially vertical orientation such that a direction of flow of the dust-laden air is substantially parallel to a planar surface of the baffle plate.

2. The dust-collecting apparatus of claim 1, further comprising a target plate located in the inlet chamber, proximate respective trailing edges of the baffle plates, and wherein the target plate is oriented such that it is substantially perpendicular to the baffle plates.

3. The dust-collecting apparatus of claim 2, wherein the baffle plates are attached to the target plate.

4. The dust-collecting apparatus of claim 1, wherein the inlet baffling system includes a baffle support structure to which at least one of the baffle plates is attached, and wherein the baffle support structure is configured to secure the baffle plates to the housing module having the inlet opening and to position the baffle plates relative to the inlet opening.

5. The dust-collecting apparatus of claim 4, wherein the baffle support structure comprises a plurality of support plates and a plurality of cross supports attached to the support plates.

6. The dust-collecting apparatus of claim 5, wherein the support plates are spaced apart from each other and each support plate has a substantially vertical orientation such that a direction of flow of the dust-laden air is substantially parallel to a planar surface of the support plate, and wherein the cross supports are spaced apart from each other and each cross support has a substantially horizontal orientation such that each cross support is substantially perpendicular to the support plates.

7. The dust-collecting apparatus of claim 1, wherein a bottom portion of the first and second housing modules further defines a hopper configured to collect dust particles.

8. The dust-collecting apparatus of claim 7, wherein the housing module having the inlet opening further includes at least one hopper baffle disposed in the hopper configured to direct dust-laden air toward the outlet chamber.

9. The dust-collecting apparatus of claim 8, wherein each hopper baffle is attached to a surface of the hopper below the inlet opening and wherein each hopper baffle extends across an entire width of the surface.

10. An inlet-side housing module for use in a dust-collecting apparatus, said module comprising:
a portion of a transverse panel dividing the module into a portion of an inlet chamber and a portion of an outlet chamber, with the portion of the transverse panel having a plurality of openings therein, the openings configured to receive a plurality of elongate filter elements;
an inlet opening that communicates with the portion of the inlet chamber for admitting dust-laden air; and
an inlet baffling system comprising a plurality of baffle plates disposed proximate the inlet opening and which are configured to facilitate a cross flow air profile for the dust-laden air,
wherein the baffle plates are spaced apart from each other and each baffle plate has a substantially vertical orientation such that a direction of flow of the dust-laden air is substantially parallel to a planar surface of the baffle plate.

11. The inlet-side housing module of claim 10, further comprising a target plate located in the portion of the inlet chamber, proximate respective trailing edges of the baffle plates, and wherein the target plate is oriented such that it is substantially perpendicular to the baffle plates.

12. The inlet-side housing module of claim 11, wherein the baffle plates are attached to the target plate.

13. The inlet-side housing module of claim 10, wherein the inlet baffling system includes a baffle support structure to which at least one of the baffle plates is attached, and wherein the baffle support structure is configured to secure the baffle plates to the inlet-side housing module and to position the baffle plates relative to the inlet opening.

14. The inlet-side housing module of claim 13, wherein the support structure comprises a plurality of support plates and a plurality of cross supports attached to the support plates.

15. The inlet-side housing module of claim 14, wherein the support plates are spaced apart from each other and each support plate has a substantially vertical orientation such that a direction of flow of the dust-laden air is substantially parallel to a planar surface of the support plate, and wherein the cross supports are spaced apart from each other and each cross support has a substantially horizontal orientation such that each cross support is substantially perpendicular to the support plates.

16. The inlet-side housing module of claim 10, wherein a bottom portion of the inlet-side housing module further defines a portion of a hopper configured to collect dust particles.

17. The inlet-side housing module of claim 16, wherein the portion of the hopper further comprises at least one hopper baffle configured to direct dust-laden air toward the portion of the outlet chamber.

18. The inlet-side housing module of claim 17, wherein each hopper baffle is attached to a surface of the portion of the hopper below the inlet opening, and wherein each hopper baffle extends across an entire width of the surface.

19. A dust-collecting apparatus, said apparatus comprising:
first and second housing modules configured to be joined longitudinally to create a housing having a transverse panel dividing the housing into an inlet chamber and an outlet chamber,
wherein one of the housing modules includes an inlet opening that communicates with the inlet chamber for admitting dust-laden air and one of the housing modules includes an outlet opening that communicates with the outlet chamber for exhausting clean air, and wherein the housing modules are configured to facilitate a cross flow air profile for the dust-laden air,
wherein the housing module that includes the inlet opening further includes an inlet baffling system comprising a plurality of baffle plates, and
wherein the baffle plates are spaced apart from each other and each baffle plate has a substantially vertical orientation such that a direction of flow of the dust-laden air is substantially parallel to a planar surface of the baffle plate.

20. The dust-collecting apparatus of claim 19, wherein the baffle plates are disposed proximate the inlet opening.

21. The dust-collecting apparatus of claim 19, further comprising a target plate located in the inlet chamber, proximate respective trailing edges of the baffle plates, and wherein the target plate is oriented such that it is substantially perpendicular to the baffle plates.

22. The dust-collecting apparatus of claim 21, wherein the baffle plates are attached to the target plate.

23. The dust-collecting apparatus of claim 19, wherein the inlet baffling system includes a baffle support structure to which at least one of the baffle plates is attached, and wherein the baffle support structure is configured to secure the baffle plates to the housing module having the inlet opening and to position the baffle plates relative to the inlet opening.

24. The dust-collecting apparatus of claim 23, wherein the baffle support structure comprises a plurality of support plates and a plurality of cross supports attached to the support plates.

25. The dust-collecting apparatus of claim 24, wherein the support plates are spaced apart from each other and each support plate has a substantially vertical orientation such that a direction of flow of the dust-laden air is substantially parallel to a planar surface of the support plate, and wherein the cross supports are spaced apart from each other and each cross support has a substantially horizontal orientation such that each cross support is substantially perpendicular to the support plates.

26. The dust-collecting apparatus of claim 19, wherein a bottom portion of the first and second housing modules further defines a hopper configured to collect dust particles.

27. The dust-collecting apparatus of claim 26, wherein the housing module having the inlet opening further includes at least one hopper baffle disposed in the hopper configured to direct dust-laden air toward the outlet chamber.

28. The dust-collecting apparatus of claim 27, wherein each hopper baffle is attached to a surface of the hopper below the inlet opening and wherein each hopper baffle extends across an entire width of the surface.

29. The dust-collecting apparatus of claim 19, wherein the transverse panel has a plurality of openings therein, and further comprising:
a plurality of elongate filter elements each having an open end and a closed end, with the filter elements being mounted to the panel such that the open ends are in registry with respective ones of the openings in the panel and the filter elements extend into the inlet chamber; and
a reverse pulse cleaning apparatus configured for periodically directing a reverse pulse of air through each of the panel openings and into the open ends of the respective filter elements.

* * * * *